United States Patent

Sautter, Jr.

[11] Patent Number: 5,154,479
[45] Date of Patent: Oct. 13, 1992

[54] POWER HEADER LATCH FOR CONVERTIBLE TOP

[75] Inventor: Robert H. Sautter, Jr., Brooklyn, Mich.

[73] Assignee: Wickes Manufacturing Company, Southfield, Mich.

[21] Appl. No.: 661,953

[22] Filed: Feb. 28, 1991

[51] Int. Cl.⁵ .............................................. B60J 7/185
[52] U.S. Cl. ..................................... 296/121; 296/224; 292/DIG. 5; 292/95; 292/114
[58] Field of Search ...................... 296/121, 224, 120.1, 296/107, 116, 117, 128; 292/95, 114, DIG. 5

[56] References Cited

U.S. PATENT DOCUMENTS

| | | | |
|---|---|---|---|
| 3,089,719 | 5/1963 | Csizmansky | 296/120.1 |
| 3,216,763 | 11/1965 | Heincelman | 296/121 |
| 3,266,838 | 8/1966 | Heincelman | 296/121 |
| 3,425,742 | 2/1969 | Rauber, Jr. | 296/121 |
| 3,443,834 | 5/1969 | Andres | 296/121 |
| 4,664,436 | 5/1987 | Eyb | 296/121 |
| 4,819,983 | 4/1989 | Alexander et al. | 296/121 |
| 4,830,426 | 5/1989 | Schlachter et al. | 296/121 |

Primary Examiner—Robert R. Song
Attorney, Agent, or Firm—David A. Greenlee

[57] ABSTRACT

A latch mechanism for latching a convertible top headed to a windshield header includes an electric motor mounted centrally on the top header which is drivingly connected by flexible drive shafts to side-rail-mounted latch units. Each latch unit includes a transmission connected to a drive shaft and an output drive screw which drives a drive nut and an attached drive link. The drive link is pivotally attached to a side-rail-mounted bell crank that is pivoted to a J-hook. Selective operation of the electric motor will cause the drive screw to shift the drive nut and drive link to move the J-hook between an extended and retracted positions. In extended position, the J-hook can be retracted to engage a windshield header abutment to latch the headers together, or retracted within the side rail for top retraction.

11 Claims, 2 Drawing Sheets

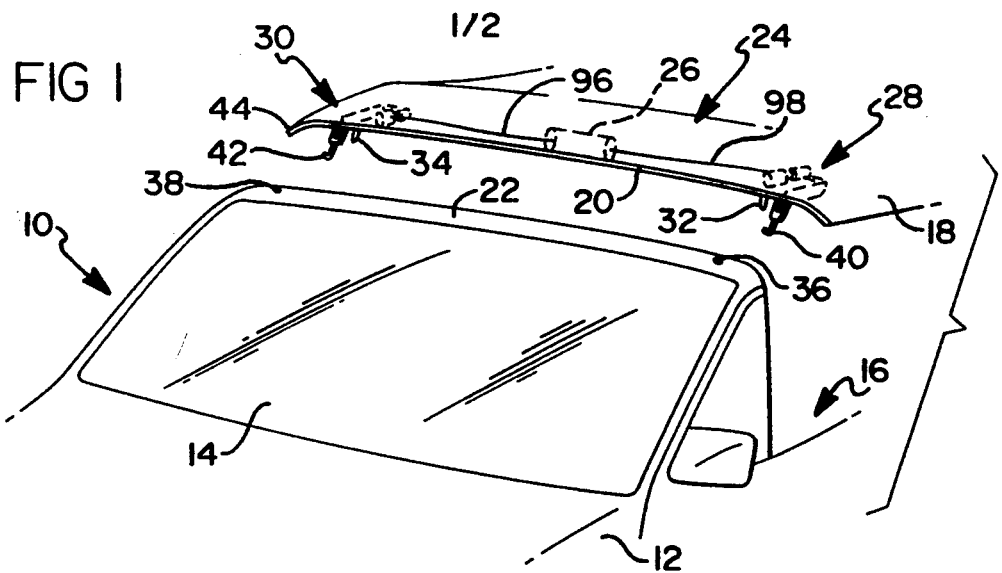
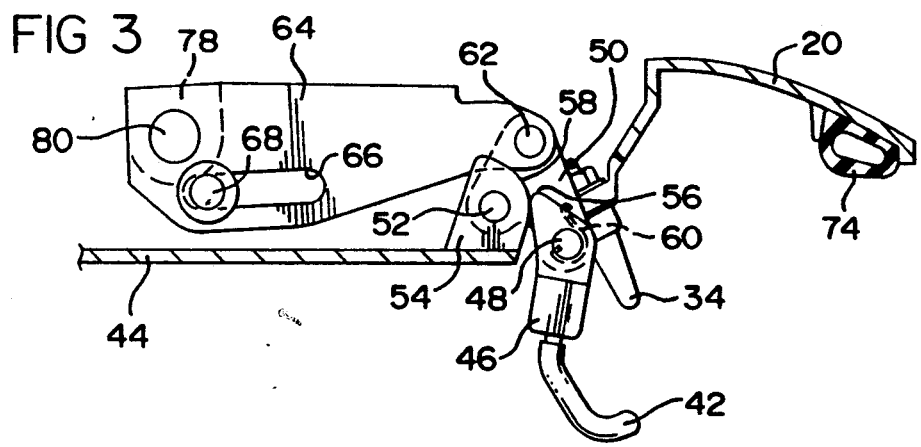
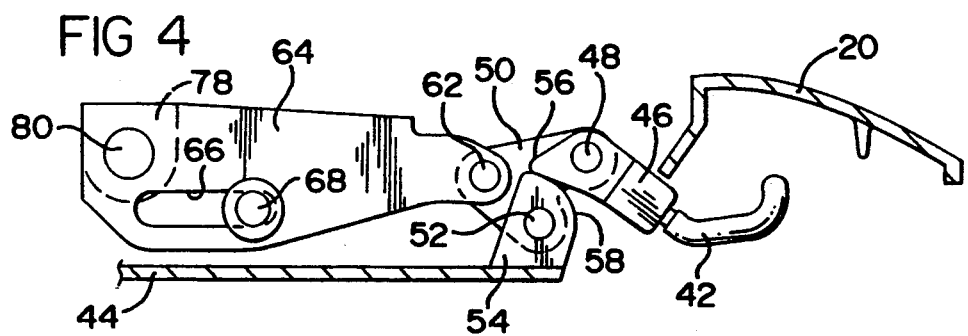
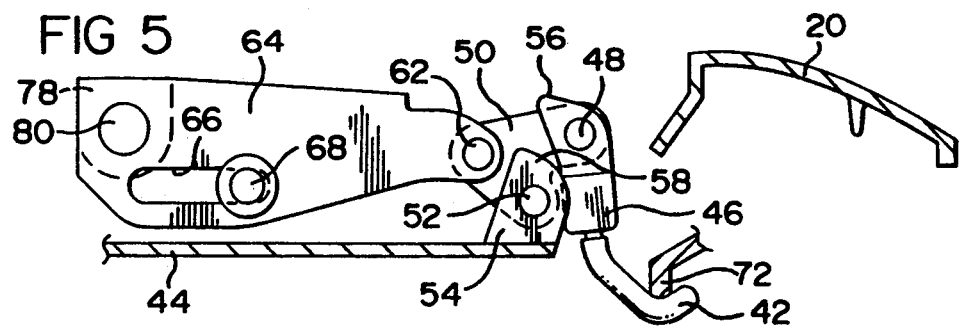

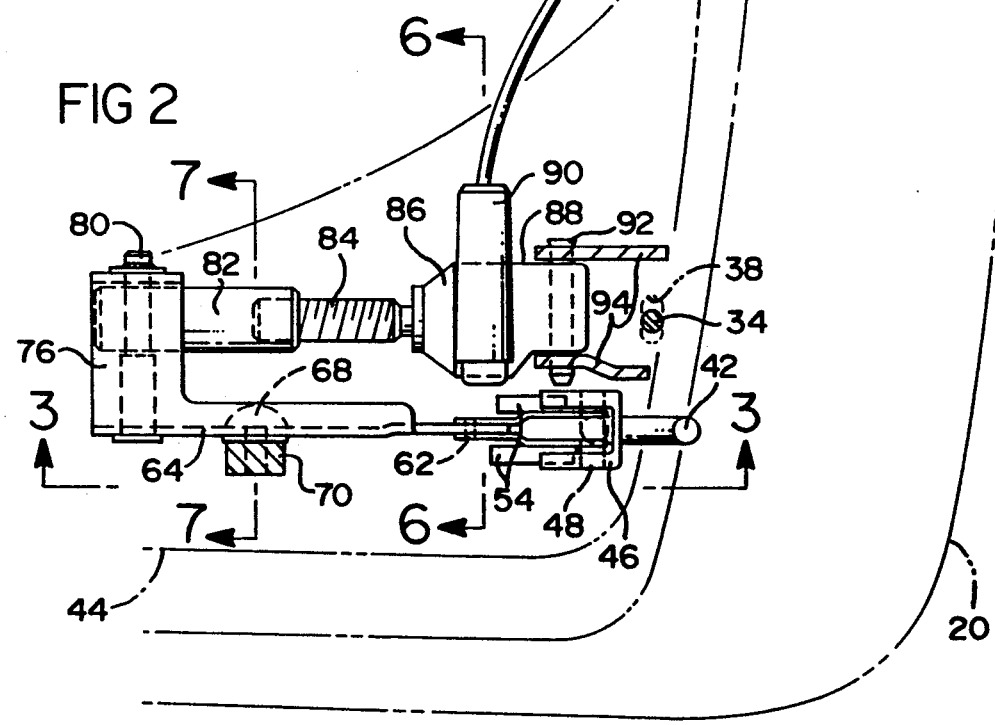

POWER HEADER LATCH FOR CONVERTIBLE TOP

FIELD OF THE INVENTION

This invention relates generally to vehicle convertible tops and, more specifically, to means for latching a convertible top to a windshield header.

BACKGROUND OF THE INVENTION

Passenger vehicles having convertible tops that can be raised to cover the passenger compartment and lowered to open the compartment predate the closed sedan type of vehicle and have been manufactured for many years. Recently, vehicles having convertible tops have become more popular with purchasers because of their ability to quickly convert from a closed vehicle to an open roadster by lowering the top. Consequently, automobile manufacturers are manufacturing a greater variety of this type vehicle.

The usual convertible top comprises an articulated top frame that supports a fabric cover. The frame includes a plurality of spaced transverse bows interconnecting articulated side rails that support the fabric cover. The rear of the cover is attached to the vehicle body or, in some cases, to a movable rear bow. The front edge of the cover is attached to the front bow, called the top header.

The top header engages the top of the vehicle windshield frame, or windshield header, in top raised position. Header latches clamp the headers together and compress a seal between them. One type of latch that is quite popular and has been used for many years is shown in U.S. Pat. No. 3,216,763 to Heincelman. This type of latch utilizes a J-hook that is mounted by a linkage on the side rail adjacent the top header. The J-hook is operated by a manual handle to engage a pin or abutment on the windshield header.

The operating handle is pivoted to the side rail and stores within the side rail when the latch is closed to latch the top to the windshield header. The handle is pulled away from the side rail to disengage the J-hook from the abutment and unlatch the top from the windshield header. The J-hook mounting linkage enables subsequent storage movement of the handle to withdraw the J-hook within the side rail to facilitate storage of the top after lowering.

Upon unlatching and handle storage, the top is folded and lowered into a storage area located behind the passenger compartment. This action may be accomplished manually or by a power operator, usually a hydraulic unit that includes a hydraulic pump that drives a pair of hydraulic cylinders which lower the top.

The top is raised by reversing the pump to operate the hydraulic cylinders to unfold the top until the top header is in close proximity to the windshield header. The latch handles are then operated to engage the J-hooks with the abutments to compress the seal and secure the headers together.

One requirement of convertible vehicles is that the top cover fit snugly on the frame to present a smooth, sleek appearance. This snug fit also reduces the vehicle's coefficient of drag, which affects gasoline mileage which is now a critical vehicle attribute due to federally-mandated CAFE requirements. A snug fit is accomplished by stretching the cover taut over the frame. Cover stretching occurs at the end of the top raising cycle by fully extending the top frame and operating the header latches.

When a power-operated top is fully raised, the fabric cover is stretched when the hydraulic cylinders fully extend the frame linkage to move the top header into close proximity to the windshield header at the end of the cycle. When the hydraulic pump is turned off, hydraulic pressure quickly diminishes in the cylinders and the top "springs back" as the stretched fabric relaxes, moving the headers apart. The top header must then be manually forced down onto the windshield header to enable the latches to be closed. Since this action requires stretching the fabric cover, a significant amount of manual effort is required to close the latches.

This problem is exacerbated during cooler weather when the top fabric stiffens, requiring increased effort to manually stretch the cover fabric to engage the headers, followed by added effort to close the latches. The added manual effort required to accomplish top latching can be quite aggravating to the vehicle owner. The conventional manual latch usually includes an over-center operation that also requires significant manual effort to unlatch.

Power latches have been devised to eliminate the manual effort required to latch the top. However, they are expensive and complex. Examples of power latches are shown in U.S. Pat. Nos. 3,425,742 to Rauber, Jr., 3,443,834 to Andres, 4,819,983 to Alexander et al, and 4,830,426 to Schlachter et al. Consequently, most convertible tops feature manual latches, the operation of which are plagued by the problem described above.

It is desirable to provide a power header latch for a convertible top that eliminates the manual effort required to latch the top and is simpler and more effective than currently available latches.

SUMMARY OF THE INVENTION

It is an object of this invention to provide a power header latch for a convertible top that eliminates the manual effort required to latch the top and is simpler and more effective than currently available latches.

In one aspect, this invention features a latch mechanism for latching a vehicle windshield header to a convertible top header and compressing a seal therebetween. The latch mechanism comprises a latch hook movably mounted adjacent each end of the top header, an abutment carried by the windshield header adjacent each end thereof for engagement by a latch hook in top raised position. A power operator is provided for selectively operating the latch hooks to engage the abutments in top raised position and move the hooks relative to the top header to compress the seal and latch the headers together, and to move the hooks relative to the top header and disengage the abutments to unlatch the headers.

In another aspect, the latch mechanism features hooks that are pivoted to the top header by a hook linkage and a power operator comprising an electric motor mounted centrally on the top header and a power transmission having an output operatively connecting the motor to each hook linkage for translating motor operation into hook movement.

In yet another aspect, the latch mechanism features each power transmission output comprising an extensible drive screw and drive nut unit in which the drive nut is pivotally attached to the hook linkage and the drive screw is rotatable to translate the drive nut therealong and pivot the hook into engagement with the windshield header abutment and move the hook to clamp the headers together.

In a further aspect, the latch mechanism features a motor mounted centrally of the top header, gearing units mounted adjacent the ends of the top header such that the motor outputs and the gearing unit inputs are misaligned, and drive shafts in the form of flexible shafts interconnecting the outputs with the inputs.

These and further features of this invention will become more readily apparent upon reference to the following detailed description and the attached drawings, in which:

DESCRIPTION OF THE DRAWINGS

FIG. 1 is a partial perspective view of a convertible vehicle incorporating a latch mechanism for latching the top header to the windshield header;

FIG. 2 is an enlarged partial plan view the latch mechanism of FIG. 1;

FIG. 3 is a sectional view taken along line 3—3 of FIG. 2, illustrating a latch in unlatched position;

FIG. 4 is a view similar to FIG. 3, but illustrating the latch in stored position;

FIG. 5 is a view similar to FIG. 3, but showing the latch in latched position;

FIG. 6 is a sectional view taken along line 6—6 of FIG. 2; and

FIG. 7 is a sectional view taken along line 7—7 of FIG. 2.

DETAILED DESCRIPTION OF A PREFERRED EMBODIMENT OF THE INVENTION

Referring to FIG. 1 of the drawings, a convertible passenger vehicle 10 has a body 12 that mounts a windshield 14. The vehicle passenger compartment 16 can be selectively opened and closed by an articulated convertible top 18 that is raised and lowered by a conventional power mechanism, not shown. In its raised position, top 18 has a transverse header 20 that is secured to an upper transverse windshield header 22 by a power latch mechanism, generally designated 24.

Latch mechanism 24 comprises a power unit 26 mounted centrally of header 20 and a pair of spaced latch units 28 and 30. Latch units 28 and 30 are symmetrically identical in construction and, therefore, only unit 30 is shown in detail in FIGS. 3-7.

As shown in FIGS. 1 and 3, top header 20 mounts two locating pins 32 and 34 which are received within respective mating locating holes 36 and 38 in the windshield header 22 as the headers are brought together. These locating pins and holes are provided to properly orient the top 18 in raised position and to assure that J-hooks 40 and 42, carried by respective latch units 28 and 30, are properly aligned for latching the headers together, as will now be described.

Since latch unit 28 is symmetrically identical, only unit 30 will be described in detail. Latch unit 30 is mounted on the top side rail 44 which extends rearwardly from header 20, as illustrated in FIGS. 2-7. The latching J-hook 42 is adjustably mounted on the lower end of a hook base 46, which is pivotally attached at 48 to a bell crank 50. Bell crank 50 is pivotally mounted by a pivot pin 52 to a bifurcated support bracket 54 extending from side rail 44.

Hook base 46 includes a cam follower 56 that is biased into contact with a cam surface 58 by a spring 60. Bell crank 50 is pivotally attached by pin 62 to a drive link 64 that includes a slot 66 which slidably receives a fixed pin 68 carried by a side rail bracket 70, is shown in FIGS. 2, 3 and 7. Operation of the J-hook between its latched, unlatched and stored positions will now be described.

FIG. 1 illustrates J-hooks 40 and 42 in their unlatched position, as shown in FIG. 3, extending from the side rails. In this FIG. 3 position, drive link 64 is moved forward until the rear of slot 66 engages fixed pin 68. This pivots bell crank 50 clockwise to extend J-hook 42, with spring 60 maintaining engagement of cam follower 56 with cam surface 58.

If the top is to be retracted, drive link 64 is moved rearwardly until the front end of slot 66 engages fixed pin 68. This rotates bell crank 50 counterclockwise from the FIG. 3 position to the FIG. 4 position. Spring 60 forces cam follower 56 to follow cam surface 58, thus pivoting J-hook 42 upwardly into a recess in the top at the juncture of side rail 44 and header 20. The top may then be lowered.

When the top is again raised to the FIG. 1 position, drive link 64 is again shifted forwardly to extend J-hook 42 to the FIG. 3 position. The top is then fully extended to mate the locating pins and holes 32, 36 and 34, 38. Referring now to FIG. 5, this action places J-hook 42 subjacent a latch abutment 72 carried by windshield header 22. Subsequent rearward movement of drive link 64 will engage J-hook 42 with abutment 72 and draw top header 20 firmly into engagement with windshield header 22, compressing a weather seal 74 between the headers. During the latching movement of from the FIG. 3 to the FIG. 5 position, spring 60 assures continued contact between J-hook 42 and abutment 72.

In a conventional environment, such as shown in the aforementioned Heincelman patent, drive link 64 is operated by a manual handle. Manual operation requires varying amounts of physical effort, as detailed above. However, this invention provides a power operator for drive link 64 to eliminate the need for any manual effort.

Referring now to FIGS. 3-5 and 7, drive link 64 includes an integral lateral arm 76 that terminates in a down-turned flange 78. Drive link 64 includes a through hole that receives a shouldered mounting pin 80 which extends through a through hole in the end of a drive nut 82. Thus, pin 80 non-rotatably secures drive nut 82 to drive link 64.

As shown in FIG. 2, drive nut 82 is threaded to drivingly receive the end of a drive screw 84 extending from an output housing portion 86 of a gear transmission 88. Transmission 88 is a conventional right angle worm-and-gear unit, including an input housing portion 90 that is perpendicular to output 86 and parallel to pivot 52 for bell crank 50 and, thus, J-hook 42. Transmission 88 is mounted by a pin 92 to a clevis 94 mounted on the top structure at the juncture of header 20 and side rail 44. Power unit 26 is a reversible conventional electric motor mounted centrally on header 20 and is drivingly connected to the input housing 86 by a conventional flexible drive shaft 96.

In operation, actuation of motor 26 by a control switch (not shown) in the passenger compartment in one direction will rotate screw 84 to shift drive nut 82 and the attached drive link 64 rearwardly to retract J-hook 42 from the FIG. 3 position to the FIGS. 4 or 5 position. Reversal of motor 26 reverse rotation of drive screw and shift drive link forwardly to extend J-hook 42 to the FIG. 3 position.

Thus, selective operation of motor 26 will result in movement of J-hook 42 between its extended position and its retracted or stored positions. Limit switches can be provided to conventionally sense the extreme positions of either the drive link 64 or the drive nut 82 to automatically shut off motor 26 in the extreme positions of J-hook 26.

Thus, this invention provides a novel convertible top latch mechanism that utilizes a proven type of latch with an effective power operator to eliminate the need for manual effort to latch or unlatch the convertible top header from the windshield header. The use of a flexible drive shaft enables misalignment of the electric output and the transmission input, as illustrated. This allows the motor to be mounted in the most desirable location from the standpoint of styling. Another advantage of the latch mechanism of this invention is that the power operator could be inexpensively replaced by a manual operator, should it be desired to produce a vehicle with power operation as an option.

While only a preferred embodiment has been illustrated, obvious modifications are contemplated within the scope of this invention and the following claims.

I claim:

1. In a vehicle having a windshield including a header, a convertible top having a header and being movable between a lowered position opening the passenger compartment and a raised position closing the passenger compartment in which the top header engages the windshield header, and a seal carried by one of the headers for engagement by the other header in top raised position, a latch mechanism for latching the headers together, comprising
    a latch hook movably mounted adjacent each end of the top header,
    an abutment carried by the windshield header adjacent each end thereof for engagement by a latch hook in top raised position, and
    a power operator comprising an electric motor mounted on the top header and a power transmission, including a gearing unit drivingly connected to and located adjacent each movable hook and a rotary drive shaft connecting each gearing unit to the motor, for selectively operating the latch hooks to engage the abutments in top raised position and move the hooks relative to the top header to compress the seal and latch the headers together, and to move the hooks relative to the top header and disengage the abutments to unlatch the headers.

2. The latch mechanism of claim 1, wherein each power transmission has an output comprising an extensible drive screw and drive nut unit for moving the hook.

3. The latch mechanism of claim 1, wherein the motor is mounted centrally of the top header, the gearing units are mounted adjacent the ends of the top header such that the motor outputs and the gearing unit inputs are misaligned, and drive shafts are flexible shafts interconnecting the outputs with the inputs.

4. The latch mechanism of claim 1, wherein the hooks are pivoted to the top header by a hook linkage and are moved relative to the pivot by the power operator to clamp the headers together.

5. The latch mechanism of claim 4, wherein the power operator comprises an electric motor mounted on the top header and a power transmission having an output operatively connecting the motor to each hook linkage for translating motor operation into hook movement.

6. In a vehicle having a windshield including a header, a convertible top having a header and being movable between a lowered position opening the passenger compartment and a raised position closing the passenger compartment in which the top header engages the windshield header, and a seal carried by one of the headers for engagement by the other header in top raised position, a latch mechanism for latching the headers together, comprising
    a latch hook movably mounted adjacent each end of the top header by a hook linkage for movement about a pivot axis,
    an abutment carried by the windshield header adjacent each end thereof for engagement by a latch hook in top raised position, and
    a power operator comprising an electric motor mounted centrally of the top header and a power transmission having a drive shaft operatively connecting the motor to each movable hook for selectively operating the latch hooks to engage the abutments in top raised position and move the hooks relative to the top header to compress the seal and latch the headers together, and to move the hooks relative to the top header and disengage the abutments to unlatch the headers, wherein each power transmission includes a gearing unit mounted adjacent the ends of the top header, an output pivotally connected to the hook linkage at a point spaced from said pivot axis, and an input perpendicular to its output and parallel to the hook pivot axis connecting the gearing unit to the motor.

7. The latch mechanism of claim 6, wherein the motor outputs and the gearing unit inputs are misaligned and the drive shafts are flexible shafts interconnecting the outputs with the inputs.

8. The latch mechanism of claim 7, wherein each gearing unit output comprises an extensible drive screw and drive nut unit for moving the hook.

9. The latch mechanism of claim 8, wherein the drive nut is pivotally attached to the hook linkage and the drive screw is rotatable to translate the drive nut therealong and pivot the hook into engagement with the windshield header abutment and move the hook to clamp the headers together.

10. In a vehicle having a windshield including a header, a convertible top having a header and being movable between a lowered position opening the passenger compartment and a raised position closing the passenger compartment in which the top header engages the windshield header, and a seal carried by one of the headers for engagement by the other header in top raised position, a latch mechanism for latching the headers together, comprising
    a latch hook pivotally mounted adjacent each end of the top header by a hook linkage,
    an abutment carried by the windshield header adjacent each end thereof for engagement by a latch hook in top raised position, and
    a power operator comprising an electric motor mounted on the top header and a power transmission including an extensible drive screw and drive nut unit operatively connecting the motor to each movable hook for selectively operating the latch hooks to engage the abutments in top raised position and move the hooks relative to their pivot to the top header to compress the seal and latch the headers together, and to move the hooks relative to the top header and disengage the abutments to unlatch the headers.

11. The latch mechanism of claim 10, wherein the drive nut is pivotally attached to the hook linkage and the drive screw is rotatable to translate the drive nut therealong and pivot the hook into engagement with the windshield header abutment and move the hook to clamp the headers together.

* * * * *